United States Patent
Maloy et al.

(10) Patent No.: US 9,009,315 B2
(45) Date of Patent: Apr. 14, 2015

(54) HIERARCHICAL DELEGATION AND RESERVATION OF LOOKUP KEYS

(75) Inventors: Jon Maloy, Montreal (CA); Per Andersson, Montreal (SE); Jonathan Lynam, San Jose, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 398 days.

(21) Appl. No.: 13/193,115

(22) Filed: Jul. 28, 2011

(65) Prior Publication Data

US 2013/0031255 A1    Jan. 31, 2013

(51) Int. Cl.
*H04L 29/12* (2006.01)
*H04L 29/06* (2006.01)

(52) U.S. Cl.
CPC ............ *H04L 61/15* (2013.01); *H04L 61/3015* (2013.01); *H04L 67/40* (2013.01)

(58) Field of Classification Search
None
See application file for complete search history.

(56) References Cited

U.S. PATENT DOCUMENTS

| | | | |
|---|---|---|---|
| 5,644,719 A | | 7/1997 | Aridas et al. |
| 7,020,602 B1* | | 3/2006 | Kim et al. ............................ 704/8 |
| 7,149,855 B2* | | 12/2006 | Chen et al. ...................... 711/154 |
| 7,200,862 B2 | | 4/2007 | Murching et al. |
| 7,299,299 B2* | | 11/2007 | Hollenbeck et al. .......... 709/245 |
| 2004/0250119 A1* | | 12/2004 | Shelest et al. ................... 713/201 |
| 2006/0168116 A1* | | 7/2006 | Adelman et al. ............... 709/218 |
| 2007/0130284 A1* | | 6/2007 | Stahura ........................... 709/217 |
| 2008/0071823 A1* | | 3/2008 | Fellman ........................... 707/102 |
| 2010/0185626 A1* | | 7/2010 | Hillis et al. ..................... 707/748 |
| 2011/0289566 A1* | | 11/2011 | Resch et al. ......................... 726/6 |
| 2012/0079115 A1* | | 3/2012 | Richardson et al. ........... 709/226 |
| 2012/0304004 A1* | | 11/2012 | Gould et al. ...................... 714/15 |

FOREIGN PATENT DOCUMENTS

| | | |
|---|---|---|
| EP | 1 645 959 A2 | 4/2006 |
| WO | WO 00/62158 A2 | 10/2000 |

OTHER PUBLICATIONS

"Domain Name System",—Wikipedia, the free encyclopedia http://en.wikipedia.org/wiki/Domain_Name_System, retrieved on Aug. 10, 2011; 16 pages.

(Continued)

*Primary Examiner* — Huy D Vu
*Assistant Examiner* — Bao G Nguyen
(74) *Attorney, Agent, or Firm* — Myers Bigel Sibley & Sajovec, P.A.

(57) ABSTRACT

A method of reserving lookup keys in a computer communication system including a hierarchy of key manager nodes includes receiving a first reservation request at a first key manager node at a first level of the hierarchy of key manager nodes. The first reservation request requests reservation of a lookup key. The methods include determining whether or not the first key manager node has authority to grant the reservation request, and, in response to determining that the first key manager node does not have authority to grant the reservation request, sending a second reservation request requesting reservation of the lookup key to a second key manager node that is at a second level of the hierarchy of key manager nodes.

18 Claims, 9 Drawing Sheets

(56) References Cited

OTHER PUBLICATIONS

Happy Codings, C++ Code Snippets sample source codes, http://www.cplusplus.happycodings.com/code_snippets/code332.html, retrieved on Aug. 10, 2011; 2 pages.

Nakamae, Shu et al., "A Study Into a Visualization of an IPv6 Network" http://www.isoc.org/inet99/proceedings/4s/4s_1.htm, retrieved on Aug. 10, 2011; 15 pages.

VeryPDF, PDF Technologies website; http://www.verypdf.com/documents/pdf-format-reference/pg_0780.htm, retrieved on Aug. 10, 2011; 3 pages.

Wilson, Paul et al., "IPv6 Address Space Management", RIPE Network Coordination Centre, Feb. 2005, http://www.ripe.net/ripe/docs/ripe-343, retrieved on Aug. 10, 2011; 6 pages.

European Search Report Corresponding to European Application No. 12004784; Dated: Dec. 12, 2012; 4 Pages.

* cited by examiner

HIERARCHICAL DELEGATION AND RESERVATION OF LOOKUP KEYS

TECHNICAL FIELD

The present invention relates to computer communications. In particular, the present invention relates to systems and methods that manage lookup keys for computer communications systems.

BACKGROUND

Many software applications are physically or logically split into separate components, or services, which communicate with each other via an inter-process communication (IPC) mechanism. For example, some components/services of a software application may act as server components that provide defined services to other software components. Software components that utilize the services of other software components may be referred to as client components.

In an IPC service, it is useful for one component to be able to send a message to another component without knowing its physical location. That is, the sending component should be able to reach a destination component using an address that is not tied to a specific physical location. In this manner, the sending component does not have to keep track of an address that may change when the destination component is moved. This feature becomes increasingly important in the currently evolving cloud based infrastructures.

It is also useful if a sending component can rely on a constant semantic meaning of a lookup key that can be used to reach a particular type of service. For example, it is useful for a sending component to be aware that "a destination that is reachable with lookup key X always provides service Y". This way, the lookup key can safely be hard-coded into the sending component without risking that it will ever become obsolete. This type of lookup key is referred to herein as a destination key, or simply a key.

When a constant semantic access key is used, a lookup step must be performed in the IPC system to obtain a physical address corresponding to the destination name. In the lookup process, a destination name is translated to a location-specific address that may be used during the subsequent message transmission.

To do the address lookup or translation, the lookup key, which may be a URL, an integer or set of integers, etc., is provided by the client to a lookup or address resolution service.

The binding, or relationship, between the lookup keys and the server addresses must be maintained somewhere in the system, for example, in one or more tables in a database. The lookup table may be consulted by the client component during lookup, and the client component may cache the returned address values. There may be one single instance of this table, but also several replicated versions of it.

In a direct method, the key value may be hard-coded into the application. A client using a "well-known" number (e.g., a port number that is registered with IRNA) to establish a TCP connection to a server is an example of a hard-coded key.

In other cases, the key value may be resolved indirectly. For example, a client and a server can use a hard-coded common identifier, such as an XML tag, so they can obtain the actual value to use as common key during initial configuration.

The basic objective of both these methods is to avoid key collision, which may occur when two keys (ports) with different semantic meanings end up having the same value in the same communication domain. Such a condition can create havoc when two such applications are co-located in the same communication domain. Both methods fulfill this requirement, but they also suffer from severe limitations.

The direct method is very inflexible, and typically also incurs a high cost for some central administration of the registered keys. It is also susceptible to a limitation of the available value space. For example, the 64,000 limitation of IP port numbers is an example of a limited value space. The 4G limitation on available IPv4 addresses is another example.

The indirect method is more flexible, since it allows locally determined values to be filled in for the common identifiers. However, even this method has limitations, since all values are assigned offline before system startup. This means that a system-wide administration of such values is needed. It also means that it may be harder than necessary to expand a running system with new servers, since all information is coming from an off-line tool.

SUMMARY

Some embodiments provide methods of reserving lookup keys in a computer communication system including a hierarchy of key manager nodes. As used herein, a "node" refers to a physical or virtual computing entity, process, server or other device in a communication network that communicates with other physical or virtual entities within the communication network. A node may include one or more physical or virtual processors and associated elements. The methods include receiving a first lookup key reservation request at a first key manager node at a first level of the hierarchy of key manager nodes and determining whether or not the first key manager node has authority to grant the reservation request. If the first key manager node does not have authority to grant the reservation request, the first key manager sends a second lookup key reservation request to a second key manager node that is at a second level of the hierarchy of key manager nodes.

The methods may further include receiving a delegation of authority to grant the reservation request from the second key manager node, and, in response to receiving the delegation of authority, granting the reservation request.

The methods may further include granting the reservation request and sending a response to the reservation request confirming reservation of the lookup key in response to determining that the first key manager node has authority to grant the reservation request.

The first reservation request may specify a first range of lookup keys, and the second reservation request may specify a second range of lookup keys that is greater than the first range of lookup keys.

The methods may further include receiving a delegation of authority from the second key manager node to reserve the second range of lookup keys, and in response to receiving the delegation of authority, reserving the first range of lookup keys and sending a response to the reservation request confirming reservation of the first range of lookup keys.

The delegation of authority includes authority to reserve a third range of lookup keys that includes the second range of lookup keys.

The methods may further include reporting reservation of the lookup key to a reservation supervisor node.

The second range of lookup keys may be at least twice as large as the first range of lookup keys, and in some embodiments, at least ten times as large as the first range of lookup keys.

The second key manager node may be a root key manager node, and the methods may further include creating the lookup key at the root manager key node.

A key manager node according to some embodiments includes a processor configured to receive a first lookup key reservation request from an application. The processor determines whether or not the key manager node has authority to grant the reservation request, and if the key manager node does not have authority to grant the reservation request, the processor can send a second reservation request requesting reservation of the lookup key to a second key manager node that is at a higher level of a hierarchy of key manager nodes than the key manager node.

A hierarchical key management system according to some embodiments includes a plurality of key manager nodes arranged in a hierarchy including a root key manager node and a plurality of intermediate key manager nodes.

Each of the intermediate nodes is configured to receive a first lookup key reservation request from an application or a lower level key manager node, and to determine whether or not the intermediate key manager node has authority to grant the reservation request. If the intermediate key manager node does not have authority to grant the reservation request, it can send a second reservation request requesting reservation of the lookup key to a second key manager node that is at a higher level of the hierarchy than the intermediate key manager node.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
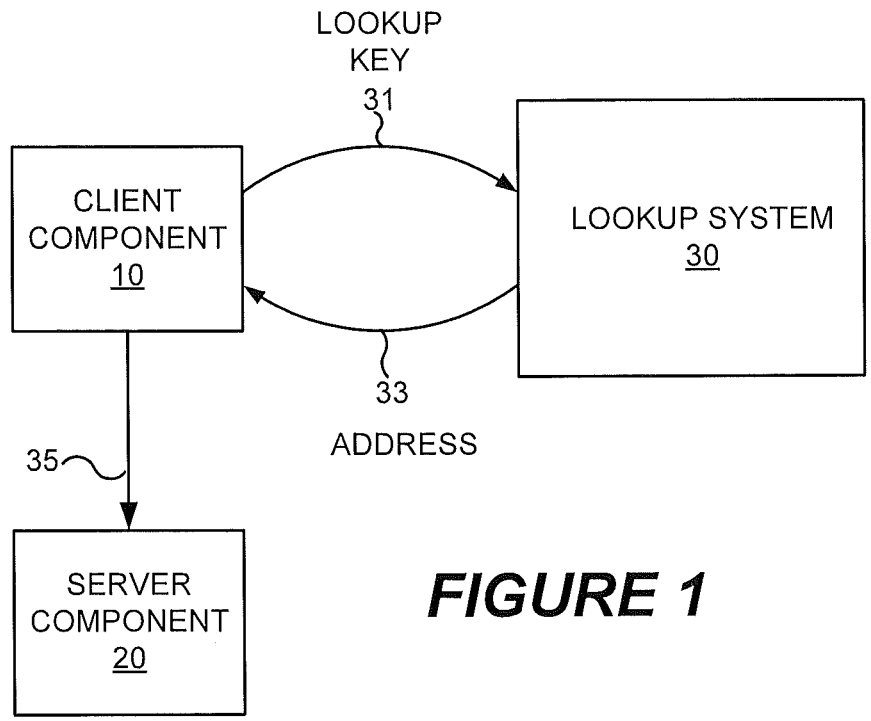
FIG. 1 is a schematic illustration of systems/methods according to some embodiments.

Some embodiments of the invention provide systems/methods for managing lookup keys. The inventive systems/methods employ a set of hierarchical key managers that manage the reservation of lookup keys in the communications system. Applications seeking to reserve a lookup key send a request to a key manager, which fulfills the request if it has the authority to reserve the requested lookup key. If it does not have authority, the key manager sends a request to a higher level key manager in the hierarchy. The reservation request continues up the hierarchy until it reaches a key manager with authority to reserve the requested lookup key. Authority to reserve the requested lookup key is then delegated down the hierarchy to the key manager that received the initial reservation request. Key reservations can be managed and balanced within a node or sub-node of the hierarchical tree of key managers.

Accordingly, lookup keys and associated name spaces can be generated and reserved dynamically during system operation, and need not be known to the key management system prior to system operation.

Embodiments of the present invention are described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

According to some embodiments, systems/methods are provided for allocating lookup keys that can be used to resolve addresses, such as addresses of servers in a computer communication system.

The use of a lookup key to obtain an address of a server is illustrated in FIG. 1. Referring to FIG. 1, a client component 10 desires to look up an address of a server component 20 using an inter-process communication (IPC) lookup system 30. Although described primarily in the context of an inter-process communication system, it will be appreciated that embodiments of the invention can be employed in any system in which it is desirable to allocate lookup keys.

FIG. 1 is a schematic illustration showing the logical relationship of the client component 10, a server component 20 and the IPC lookup system 30, and does not indicate the physical relationship between the components. The components can exist as software components in a single computer system, in the same or different partitions of a single computer system and/or in distributed computer systems that are coupled together by a communication network. Moreover, the components of the IPC lookup system 30 may be located in a single computer system, in the same or different partitions of a single computer system and/or in distributed computer systems that are coupled together by a communication network.

Referring to FIG. 1, the client component 10 issues a lookup request 31 to the IPC lookup system 30. The lookup request 31 includes a lookup key, which may, for example, be the name or other identity of the server component 20 whose address is sought by the client component 10.

The IPC lookup system 30 returns a response 33 to the client component including information associated with the lookup key. The information returned by the lookup system 30 may include an address of the server component 20 or other information from the address of the server component 20 may be generated. The client component 10 may then send a message 35 to the server component 20 using the address.

Embodiments of the invention are directed to the administration of the lookup keys. Particular embodiments of the invention are directed to systems/methods for reserving lookup keys within a communications system. Lookup keys may be reserved by key managers in a way that reduces or minimizes the possibility of key collisions, i.e., the undesirable situation in which the same lookup key is allocated for use by two different applications in the same system.

Some embodiments employ a name space identifier that defines the validity scope of a key. The name space identifier allows the key management system to allocate keys hierarchically in a distributed manner. This can reduce the risk of key collisions and may eliminate the need for an off-line key reservation tool.

The name space identifier may be a long string in some embodiments, which may reduce the risk of name space collisions. If a name space collision should occur, the risk of further problems due to actual key collision is still reduced, as explained below.

Some embodiments also provide a real-time administration delegation tool that enables reservation of domain-specific keys and dynamically expands the key value space while reducing the risk of collisions within a given name space or key space.

Figure 2:
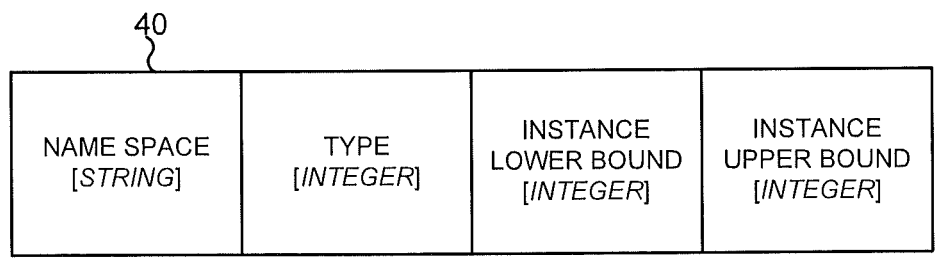
FIG. 2 illustrates a lookup key format in accordance with some embodiments.

In the examples described herein, the key format shown in FIG. 2 is used. However, it will be appreciated that the present invention is not limited to the particular type of key format that is used.

Referring to FIG. 2, the key format includes a Name Space, a Type, an Instance Lower Bound and an Instance Upper Bound.

The Name Space field indicates the validity scope of a key (i.e. the scope for which the lookup key definition is valid). The Name Space field reduces the risk of key collisions in a large system. The value range of the Name Space may be very large, since the allocation of such spaces may be made in a uncoordinated manner by the users. In the example shown in FIG. 2, the Name Space parameter is a string. However, a large (e.g., 64-bit) integer could be used in some embodiments.

The Key Type field indicates the functionality of the service requested. The Key Type parameter is specified as an integer in the example of FIG. 2. However, the Key Type can be any desired data type.

The Instance Lower Bound and Instance Upper Bound fields indicate one or more instances of the service requested. If the fields values are equal, then the key refers to a single instance of the service.

If the Instance Lower Bound and Instance Upper Bound fields contain different values, the upper bound must be bigger than lower bound. In this case, the key indicates either any of the service instances within the sequence [lower bound, upper bound], or all instances belonging to this sequence. The actual interpretation is left to the user of the key, and may vary depending on the context where it is used.

It is possible to have other key formats in other embodiments of the invention. For example, the Name Space field could be something other than a string, the Type field could be something else than an integer, etc.

The semantic meaning of the keys and key sequences may be left to the reserving applications to decide and need not be known to the key management system.

Figure 3A:
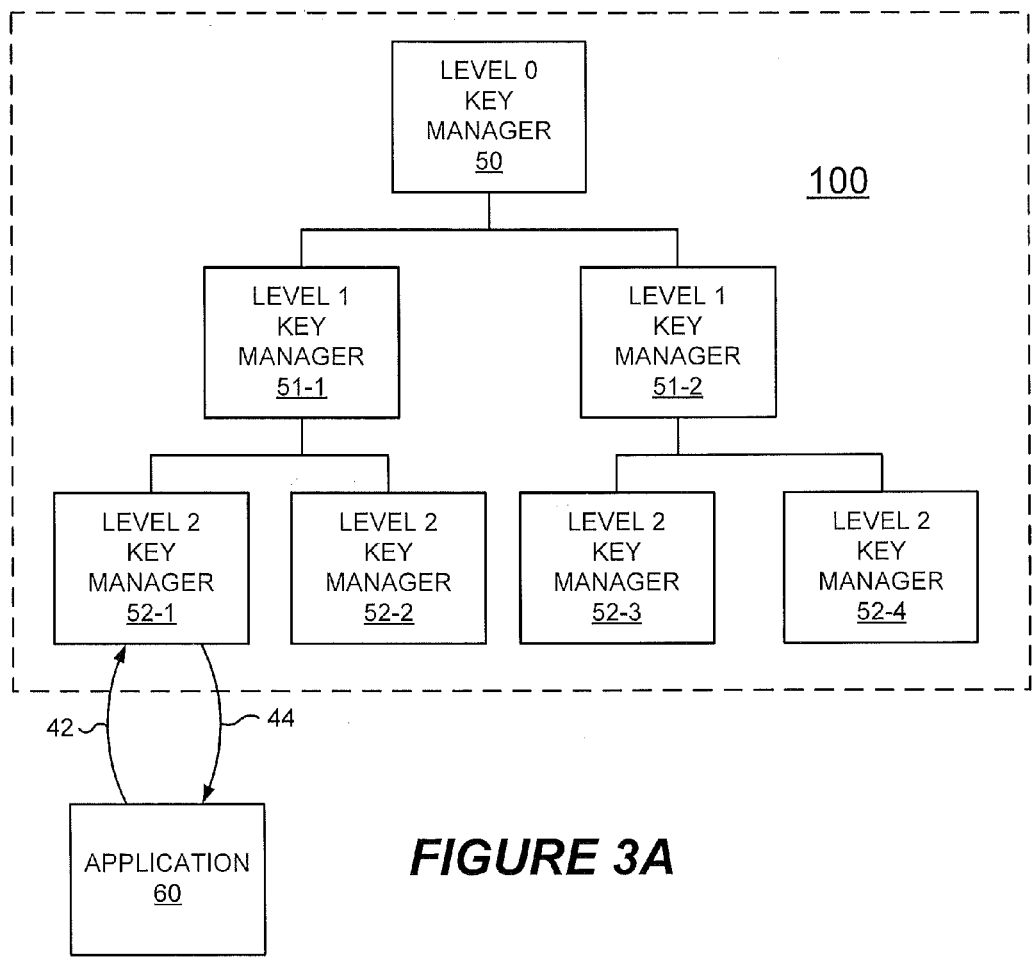
FIG. 3A illustrates a hierarchical key management system in accordance with some embodiments.

According to some embodiments, Name Spaces and lookup keys are managed by a hierarchical key manager system, such as the hierarchical key management system 100 shown in FIG. 3A. The key management system 100 includes a plurality of key managers 50, 51, 52 arranged in a hierarchical structure including a root, or Level 0 key manager 50, a plurality of Level 1 key managers 51-1, 51-2, situated in the hierarchy below the root key manager 50, and a plurality of Level 2 key managers 52-1 to 52-4 situated in the hierarchy below the Level 1 key managers 51-1, 51-2. Although three levels are illustrated in the key management system 100, a key management system according to some embodiments may have two levels or more than three levels. An application 60, which may for example be an application running on a server component 20, sends a request 42 for reservation of a lookup key in a specified name space to a low level key manager 52-1 that is assigned to or otherwise associated with the application 60. For example, the key manager 52-1 may be assigned to manage reservation of lookup keys in a domain in which the server component 20 is registered.

Assuming successful allocation of the lookup key, the key manager 52-1 responds with a message 44 indicating that the reservation was granted. The lookup key can thereafter be used by client applications to obtain the network address of the application 60. Although not illustrated in FIG. 3A, the low level key manager 52-1 may have to forward the reservation request to a higher level key manager to obtain authority to reserve the lookup key before the lookup key can be reserved.

Name Spaces and lookup keys can be created in three different ways. For example, Name Spaces and keys can be hard-coded at design time. In that case, users have pre-reserved values for both name-spaces and key types. This may be practical for some well-known services, and may be particularly useful for assigning lookup keys to a configuration server or a key delegation server/key manager itself. A delegation tool that is used with other key creation methods may be aware of these reserved name spaces and values, in case it needs to reserve other key ranges.

Figure 4A:
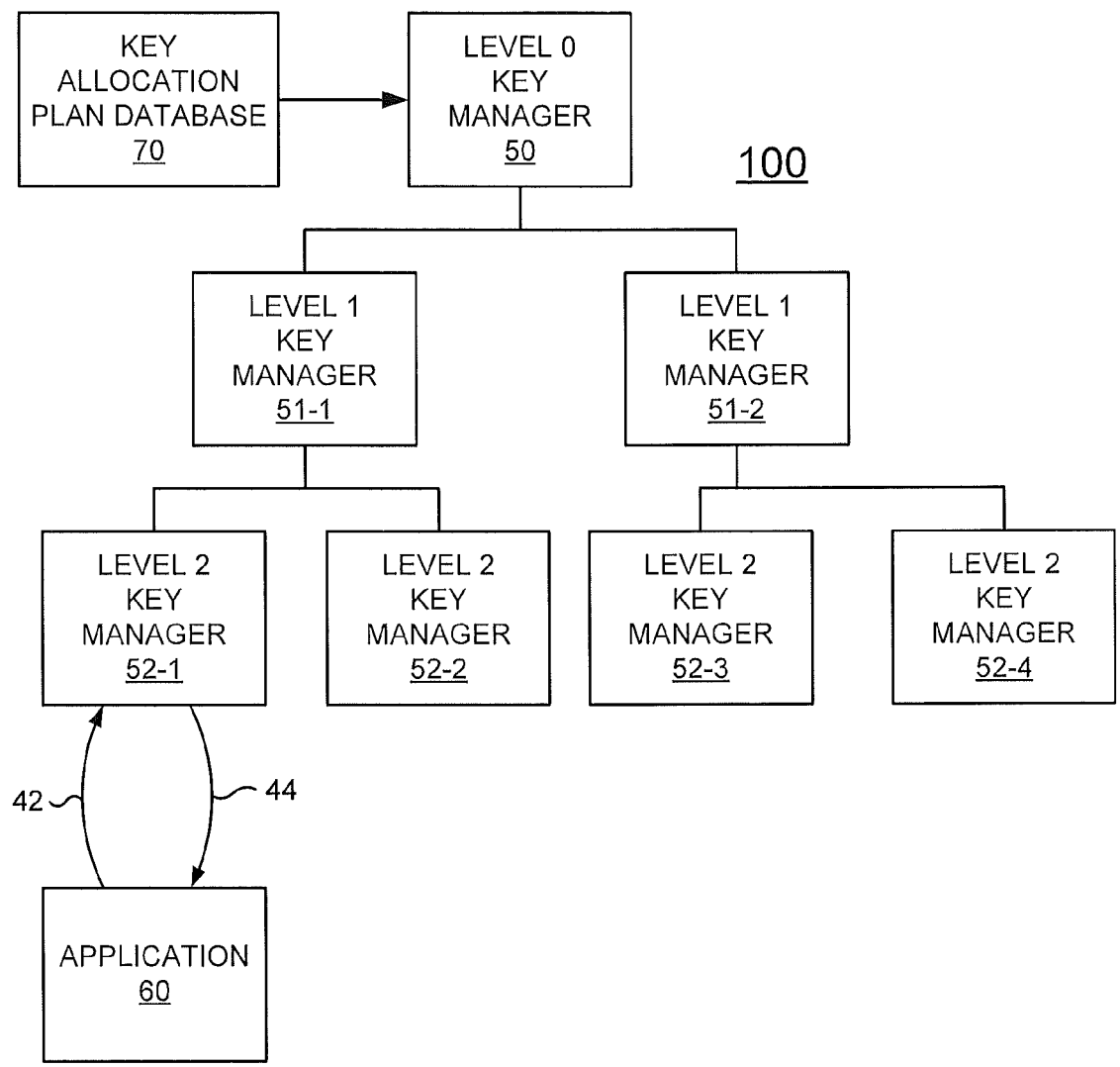
FIG. 4A illustrates a hierarchical key management system in accordance with some embodiments.
Figure 4B:
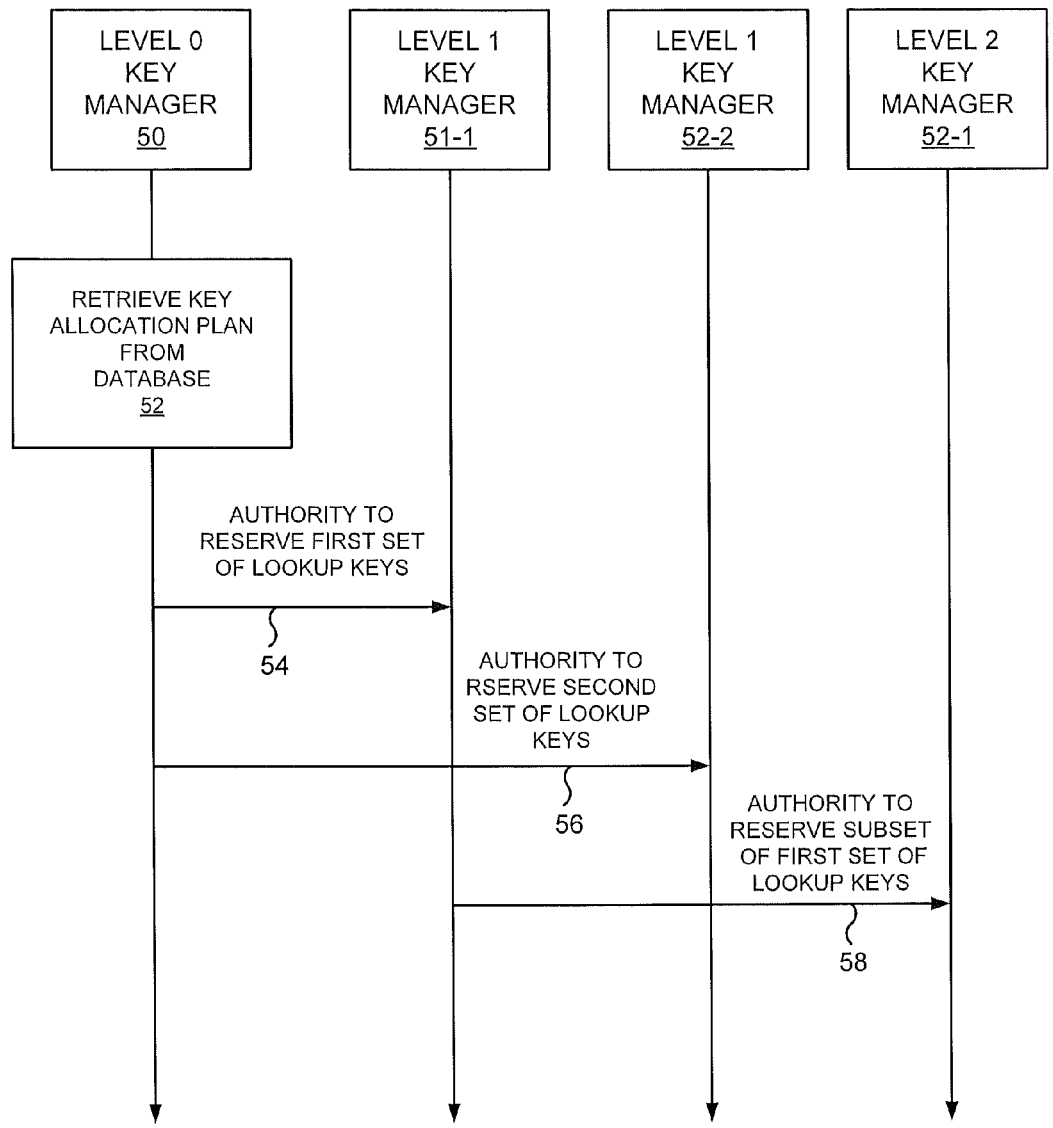
FIG. 4B is a flow diagram illustrating an example of delegation of key allocation authority in the hierarchical key management system of FIG. 4A.

In other embodiments, the Name Spaces and keys can be pre-configured, for example, at system startup. Referring to FIGS. 4A and 4B, the hierarchical key management system 100 is again illustrated. The high level (Level 0) key manager 50 has access to a key allocation plan database 70 that includes configuration data, such as in the form of an XML file, that specifies which name spaces, types, and instance ranges should be defined in the system and the levels that have authority to allocate lookup keys within the specified name spaces.

Referring to FIG. 4B, the Level 0 key manager 50 retrieves the key allocation plan from the database 70 (Block 52). Based on the configuration data in the key allocation plan, the Level 0 key manager 50 grants authority to lower level key managers in the key management system 100 to reserve lookup keys within specified name spaces. For example, the Level 0 key manager 50 may delegate authority to reserve a first set of lookup keys to the Level 1 key manager 51-1 via a delegation message 54. The Level 0 key manager 50 may delegate authority to reserve a second set of lookup keys to the Level 1 key manager 51-2 via a delegation message 56. Similarly, the Level 1 key manager 51-1 may delegate authority to reserve a subset of the first set of lookup keys to the Level 2 key manager 52-1 via a delegation message 58.

In still other embodiments, Name Spaces and key sequences may be created dynamically on request from the applications. For example, an application may request allocation of a lookup key of a specified type within a specified name space, and the key management system responsively creates a key of the specified name space and type, even if the key management system knew nothing about the specified name space and/or type in advance.

It will be appreciated that a key management system in accordance with some embodiments could use more than one of these methods to establish name spaces, lookup keys and key reservation authority. For example, a key management system 100 could have some lookup keys and name spaces hard coded, could read some additional lookup keys from a configuration database, and could reserve new lookup keys and name spaces dynamically as requested by applications.

Referring again to FIG. 3A, the task of managing keys and key range reservations is delegated according to a hierarchical scheme. In some embodiments, the top node in a hierarchy of key managers (e.g., the Level 0 key manager) is initially the only one allowed to reserve new name spaces, keys and key ranges. However, the Level 0 key manager may delegate authority to lower level key managers dynamically. Each key manager has authority to delegate key management authority to lower level key managers in the hierarchy over the reservation of keys for which it has itself been granted authority to manage by a higher level key manager.

Figure 3B:
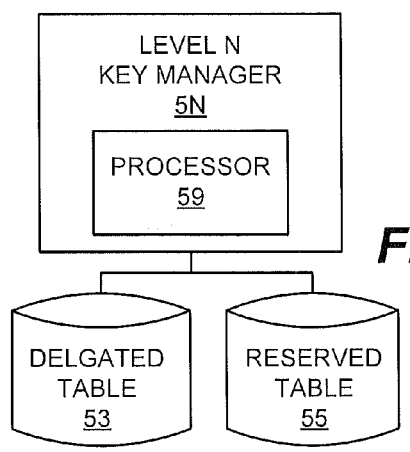
FIG. 3B illustrates a key manager in accordance with some embodiments.

Referring to FIG. 3B, the key manger 5N at each level has a processor 59 configured to perform the functions described herein an associated database 53 called the Delegated Table, in which it keeps track of the key ranges it has been delegated to administer by the next upper level key manager. The key manager 5N at each level also has a database 55 called the Reserved Table, in which it keeps track of which keys and ranges have been delegated to/reserved by the next lower level key managers or by applications.

Irrespective of allocation method (hard-coded, configured or dynamic), keys may be delegated according to two different methods, namely a push method and an on-demand method.

In the push method, key ranges are delegated (pushed) downwards in the hierarchy in an unsolicited manner. The size of the ranges pushed downwards at each level may be hard-coded, configured or determined using a predetermined algorithm.

In the on-demand method, key ranges may be delegated downwards as a reaction to a reservation request received from a lower level key manager or from an application. The size of the delegated range need not be exactly the one requested. The requesting entity may itself have used different methods (configured, hard-coded, algorithm) to decide which key range to request.

Key ranges are reserved by applications or by lower-level key managers by sending key reservation requests to upper-level key managers. If a key manager does not have a large enough range of delegated keys left to grant in response to the reservation request, or the key or name space that is being requested is entirely unknown to the key manager, it may propagate the request upwards in the hierarchy until the request reaches a key manager that is able to fulfill the request. At each level, the key manger may increase the requested range, so that it can reserve a part of the newly delegated range to serve future requests. Furthermore, a higher level key manager that grants authority to a lower level key manager in response to a reservation request may grant a larger range of keys than was initially requested.

Figure 5:
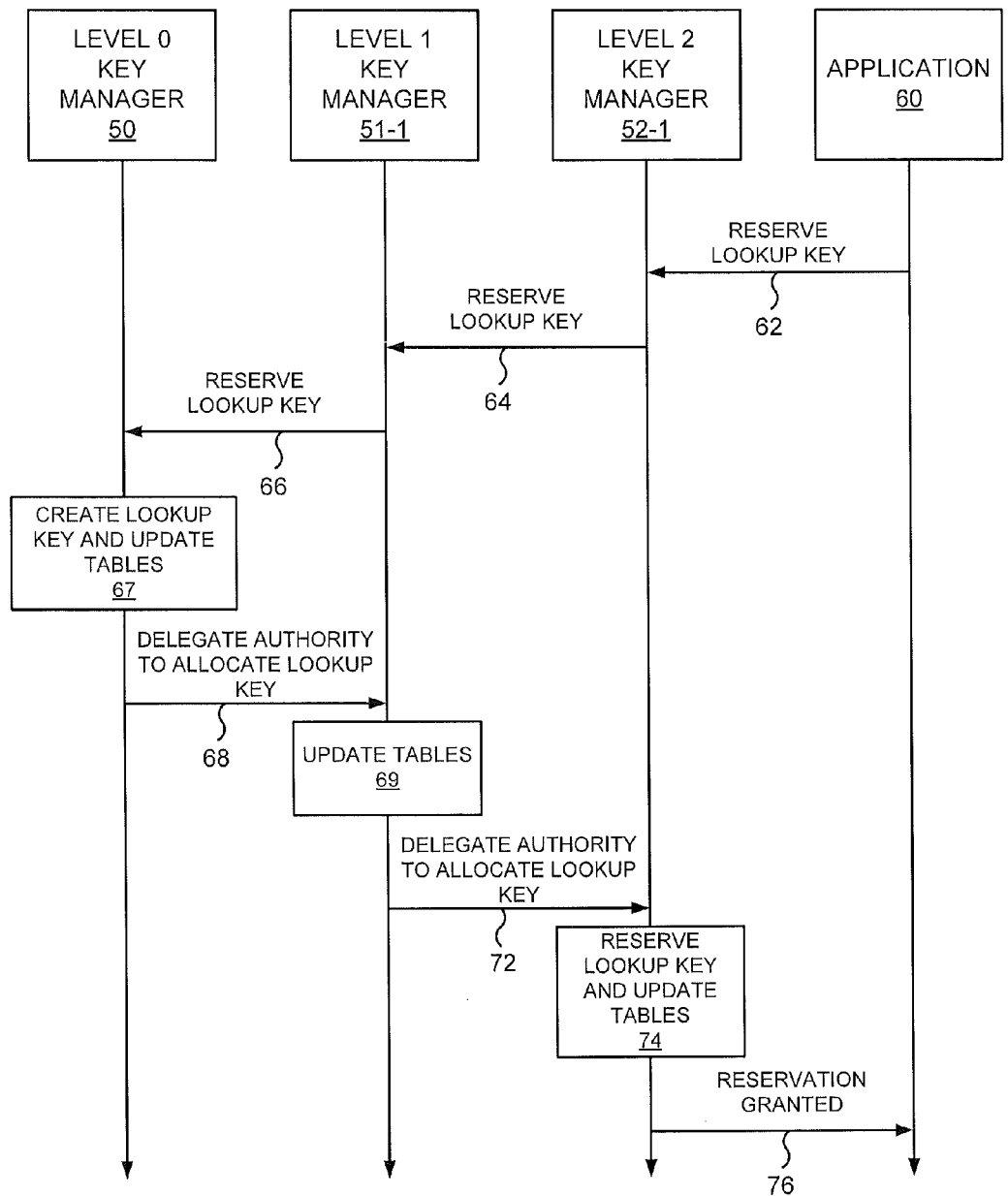
FIG. 5 is a flow diagram illustrating an example of dynamic reservation of lookup keys in accordance with some embodiments.

FIG. 5 illustrates an example of dynamic reservation of a single lookup key. Referring to FIG. 5, an application 60 issues a request 62 to reserve a lookup key to a level 2 key manager 52-1. The reservation request 62 may have a format that specifies the scope, or name space, and the type of the requested key. For example, the reservation request 62 may have the form "reserve(scope='ipc', type_string= 'apptype')". The 'scope' parameter identifies the name space of the desired lookup key, while the 'type_string' parameter identifies the application type.

Upon receipt of the reservation request 62, the level 2 key manager 52-1 checks its Delegated Table 53 to determine if it has been delegated the authority to reserve a key within the specified scope. In the example shown in FIG. 5, the level 2 key manager 52-1 does not have the authority to reserve a key within the scope "ipc", so the level 2 key manager 52-1 issues a reservation request 64 to the next higher level key manager in the hierarchy, which is the level 1 key manager 51-1.

The reservation request 64 may have the form "reserve (scope='ipc', type_string='apptype', index=121)." As above, the 'scope' parameter identifies the name space of the desired lookup key, while the 'type_string' parameter identifies the application type. The 'index' parameter identifies the particular reservation request from among other reservation requests that may be issued from the level 2 key manager 52-1 to the level 1 key manager 51-1.

Upon receipt of the reservation request 64, the level 1 key manager 51-1 checks its Delegated Table 53 to determine if it has been delegated the authority to allocate a key within the specified scope. Like the level 2 key manager, the level 1 key manager 51-1 in this example does not have the authority to allocate a key within the scope "ipc", so the level 1 key manager 51-1 issues a reservation request 66 to the next higher level key manager in the hierarchy, which is the level 0 key manager 50. The reservation request 66 may have the form "reserve(scope='ipc', type_string='apptype', index=290)." As above, the 'scope' parameter identifies the name space of the desired lookup key, the 'type_string' parameter identifies the application type, and the 'index' parameter identifies the particular reservation request from among other reservation requests that may be issued from the level 1 key manager 51-1 to the level 0 key manager 50.

As the top level key manager, the level 0 key manager 50 has the ability to create and allocate lookup keys in any name space, including previously unknown name spaces. In response to the reservation request 66, the level 0 key manager 50 examines the request and checks its Reserved Table 55 to see if the requested key has already been created and allocated to a different level 1 key manager.

Assuming the requested lookup key has not already been allocated, the level 0 key manager 50 creates the requested lookup key (block 67), for example using a command having the form "create(namespace='ipc',type_string='apptype', type=42). Note that the level 0 key manager 50 reads the specified type string ('apptype') and generates a numeric type (42) corresponding to the specified type string. The numeric type is then used subsequently by the key managers when allocating lookup keys of the specified type string.

Once the requested lookup key has been created in the specified name space, the level 0 key manager 50 delegates authority to allocate the lookup key to the level 1 key manager 51-1 that requested the lookup key via a delegate message 68, which may have the format "delegate(scope='ipc', type=42, type_string='apptype', index=290). The level 0 key manager updates its Reserved Table 55 and its Delegated Table 53 to indicate that it has created the lookup key and delegated authority to manage the key to the level 1 key manager.

Likewise, the level 1 key manager 51-1 updates its Delegated Table 53 to indicate that it has been delegated authority to manage the lookup key (block 69), forwards the delegation to the level 2 key manager 52-1 via a delegate message 72, and updates its Reserved Table 55 to indicate that it has delegated authority to manage the lookup key to the level 2 key manager 52-1. The delegate message 72 may have the format "delegate (scope='ipc', type=42, type_string='apptype', index=121).

The level 2 key manager updates its Delegated Table 53 to indicate that it has been delegated authority to manage the lookup key and allocates the lookup key on behalf of the application 60 (block 74). The level 2 key manager 52-1 sends a reservation granted message 76 to the application 60. The granted message 76 may have the format "granted (scope='ipc', type=42, type_string='apptype'). Subsequent reservation requests for additional key space may identify only the application type rather than the type_string.

Finally, the level 2 key manager updates its Reserved Table 55 to indicate that it has reserved the lookup key for the application 60.

Figure 6:
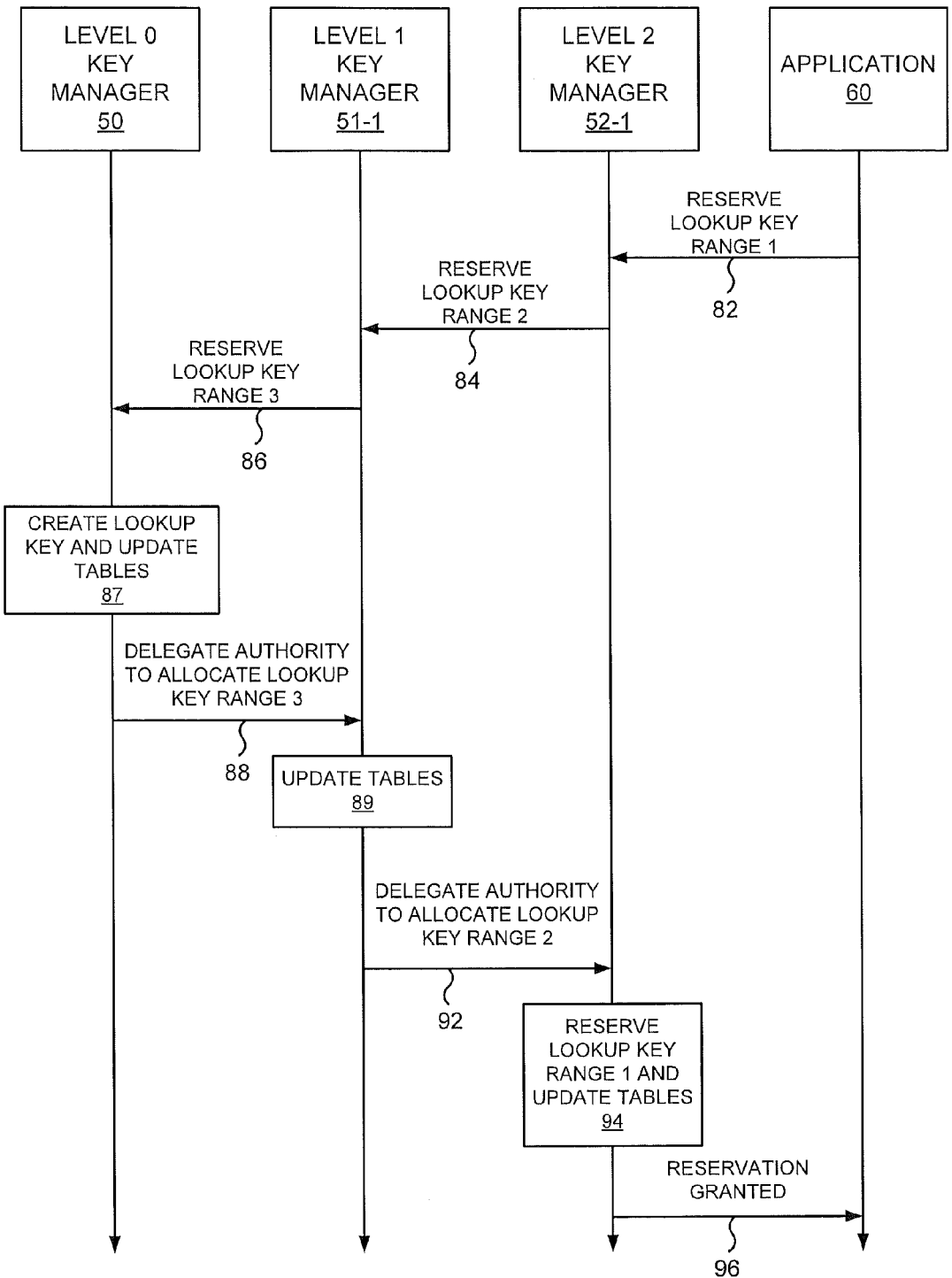
FIGS. 6 and 7 are a flow diagrams illustrating examples of dynamic reservation of lookup key ranges in accordance with some embodiments.

FIG. 6 illustrates an example that uses dynamic key allocation, on-demand delegation and algorithmic key range reservation. In the example illustrated in FIG. 6, each intermediate key manager is configured to increase the requested range by a factor of ten when forwarding the request up the hierarchy.

Referring to FIG. 6, an application 60 issues a request 82 to reserve a range of lookup keys to a level 2 key manager 52-1. The reservation request 82 may have a format that specifies the scope, or name space, and the type of the requested key, as well as the size of the requested range. For example, the reservation request 82 may have the form "reserve (scope='ipc', type_string='apptype', range=100)". The 'range' parameter indicates the number of lookup keys the application is requesting to be reserved.

Upon receipt of the reservation request 82, the level 2 key manager 52-1 checks its Delegated Table 53 to determine if it has been delegated the authority to reserve the requested range of keys within the specified scope. In the example shown in FIG. 6, the level 2 key manager 52-1 does not have the authority to reserve the requested range of keys within the scope "ipc", so the level 2 key manager 52-1 issues a reservation request 84 to the next higher level key manager in the hierarchy, which is the level 1 key manager 51-1.

The reservation request 84 may specify a larger range of keys than the reservation request 82 specified, so that the level 2 key manager 52-1 will have a supply of keys for use in responding to subsequent reservation requests. For example, the level 2 key manager 52-1 may be configured to request reservation of a key range that is at least twice the size, and in some embodiments ten times larger than, the size of the range specified in the reservation request 82 that was received by the level 2 key manager 52-1. Accordingly, the reservation request 84 may have the form "reserve(scope='ipc', type_string='apptype', range=1000, index=28)". That is, the reservation request 84 requests a nominal range of keys (Range 2) that is larger than the range of keys (Range 1) that was initially requested by the application 60.

In some embodiments, the reservation request 84 may also indicate the range of keys (Range 1) that was initially requested by the application 60 as a minimum number of keys requested. In such embodiments, the reservation request 84 may have the form "reserve(scope='ipc', type_string='apptype', range=1000, min_range=100, index=28)".

Upon receipt of the reservation request 84, the level 1 key manager 51-1 checks its Delegated Table 53 to determine if it has been delegated the authority to reserve the requested key range within the specified scope. If the nominal requested range is not available, the level 1 key manager may check to see if it has authority to reserve at least the minimum range requested (min_range).

Like the level 2 key manager, the level 1 key manager 51-1 in this example does not have the authority to allocate a range of keys within the scope "ipc", so the level 1 key manager 51-1 issues a reservation request 86 to the next higher level key manager in the hierarchy, which is the level 0 key manager 50.

The reservation request 86 may specify a larger range of keys than the reservation request 84 specified, so that the level 1 key manager 51-1 will have a supply of keys for use in responding to subsequent reservation requests. Like the level 2 key manager 52-1, the level 1 key manager 51-1 may be configured to request reservation of a key range that is at least twice the size, and in some embodiments ten times larger than, the size of the range specified in the reservation request 84 that was received by the level 1 key manager 51-1. Accordingly, the reservation request 86 may have the form "reserve (scope='ipc', type_string='apptype', range=10000, min-range=100, index=511)". That is, the reservation request 86 requests a range of keys (Range 3) that is larger than the range of keys (Range 2) that was initially requested by the level 2 key manager 52-1. The reservation request 86 may also specify the minimum requested range.

In response to the reservation request 86, the level 0 key manager 50 examines the request and checks its Reserved Table 55 to see if the requested name space has already been created, and if so, what range of keys has been reserved to a different level 1 key manager.

Assuming the requested lookup key has not already been reserved, the level 0 key manager 50 creates the requested lookup key (block 87), for example using a command having the form "create(namespace='ipc',type_string='apptype', type=42, Lower=0, Upper=0xffffffff).

Once the requested lookup key has been created in the specified name space, the level 0 key manager 50 delegates authority to allocate the lookup key to the level 1 key manager 51-1 that requested the lookup key via a delegate message 88, which may have the form "delegate(scope='ipc', type=42, type_string='apptype', lower=0, upper=1000000, index=511)." Accordingly, in some embodiments, the level 0 key manager 50 may grant authority to reserve an even larger range of keys than was requested by the level 1 key manager 51-1.

Note that the range of lookup keys can be located anywhere within the available range of lookup keys created by the level 0 key manager 50. In this example, the range delegated to the level 1 key manager 51-1 is between 0 and 1,000,000. The level 0 key manager updates its Reserved Table 55 and its Delegated Table 53 to indicate that it has created the lookup key and delegated authority to manage the key to the level 1 key manager.

Likewise, the level 1 key manager 51-1 updates its Delegated Table 53 to indicate that it has been delegated authority to manage the lookup key (block 89), and updates its Reserved Table 55 to indicate that it has delegated authority to manage the lookup key to the level 2 key manager 52-1. The level 1 key manager 51-1 sends a delegation to the level 2 key manager 52-1 via a delegate message 82 having the form "delegate(scope='ipc', type=42, type_string='apptype', lower=100,000, upper=200,000, index=28)." Note that the range of lookup keys can be located anywhere within the available range of lookup keys delegated to the level 1 key manager 51-1. In this example, the range delegated to the level 2 key manager 52-1 is between 100,000 and 200,000.

The level 2 key manager updates its Delegated Table 53 to indicate that it has been delegated authority to manage the lookup key and reserves the lookup key on behalf of the application 60 (block 94). The level 2 key manager 52-1 sends a reservation granted message 76 to the application 60 having the form "granted(scope='ipc', type=42, type_string='apptype', lower=101,100, upper=101,199)." Note that the range of 100 lookup keys can be located anywhere within the available range of lookup keys delegated to the level 2 key manager 52-1. In this example, the range granted to the application 60 is between 101,100 and 101,199.

Finally, the level 2 key manager updates its Reserved Table 55 to indicate that it has reserved the lookup key for the application 60.

Figure 7:
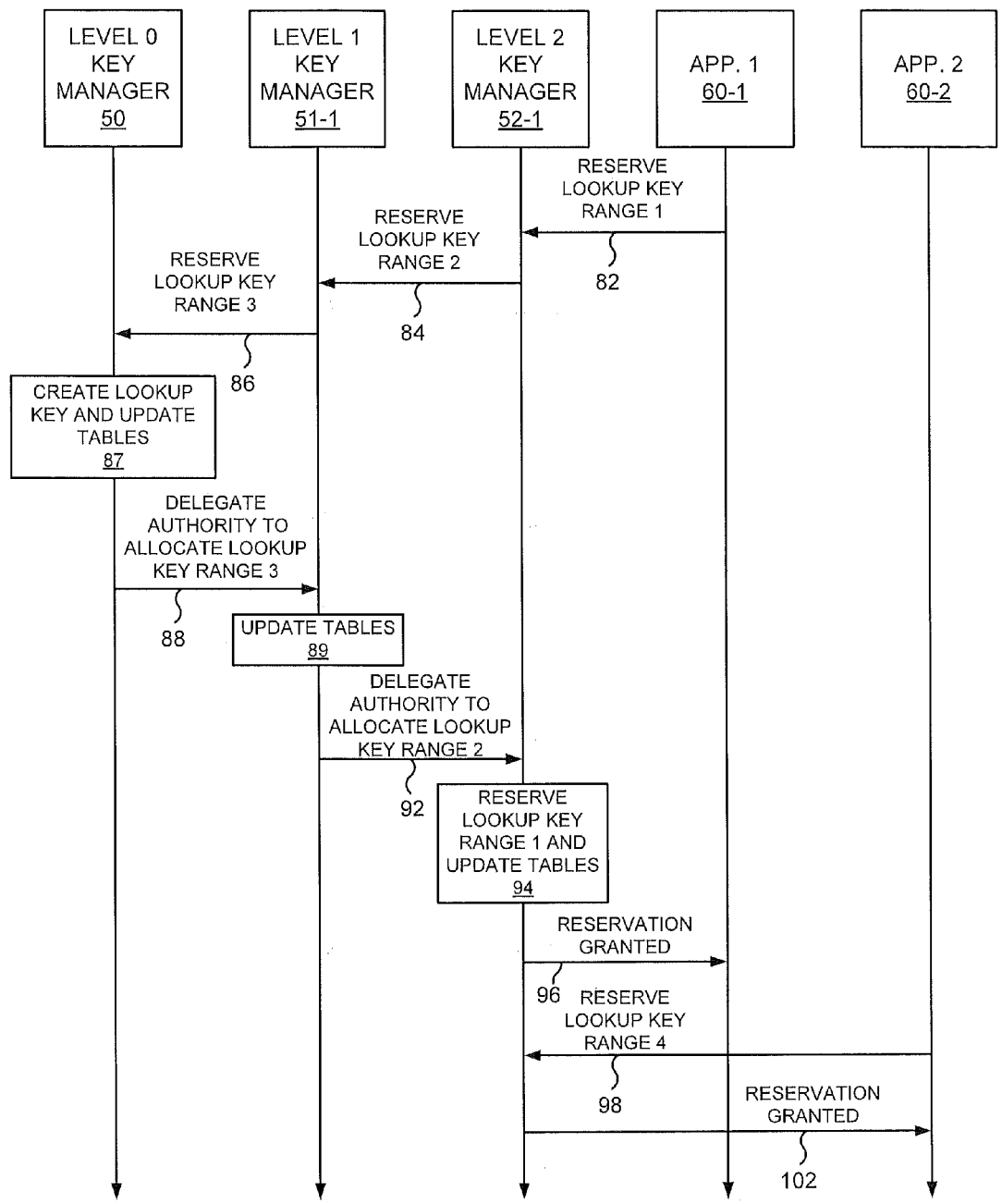

FIG. 7 is a flow diagram similar to FIG. 6, except that FIG. 7 illustrates that a second application 60-2 may issue a reservation request 98 to the level 2 key manager that specifies a range of lookup keys (range 4). The reservation request 98 may specify the application type by the assigned type number instead of the typestring value. The level 2 key manager 52-1 checks its Delegated Table 53 and Reserved Table 54 and determines that it has authority to grant the requested range of keys. Thus, the level 2 key manager issues a reservation granted message 102 to the second application 60-2 without having to request reservation of additional keys from the level 1 key manager 51-1.

Figure 8:
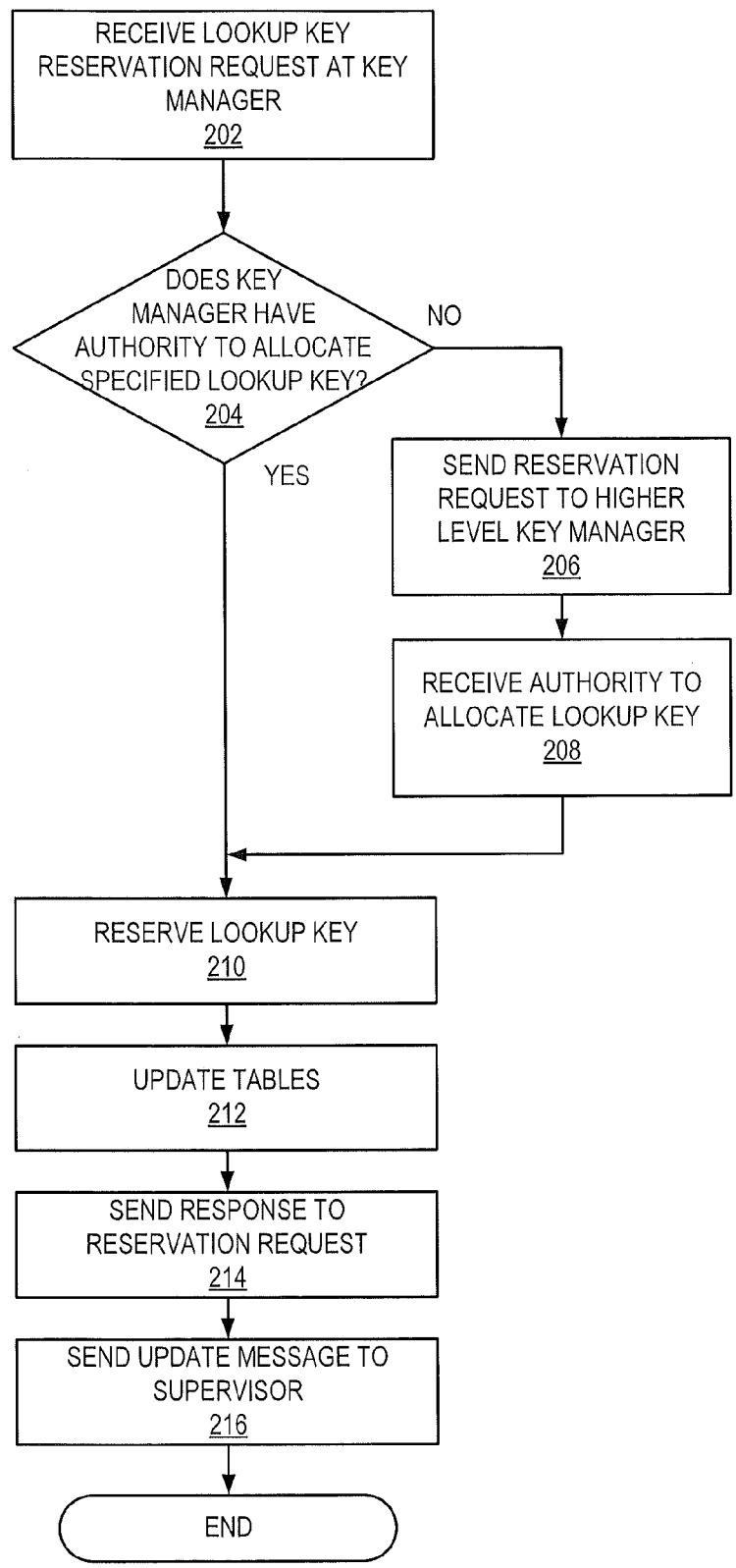
FIG. 8 is a block diagram illustrating operations of a key manager in accordance with some embodiments.

FIG. 8 is a flowchart illustrating operations of a key manager in accordance with some embodiments.

Referring to FIG. 8, operations begin at block 202 with the receipt of a lookup key reservation request at the key manager (block 202). The reservation request may specify a key or range of keys, a name space in which the key is valid, and a type of application that is to be associated with the key. The key manager checks to see if it has the authority to reserve the specified lookup key (block 204). For example, the key manager may check its local Delegated Table 53 and Reserved Table 55 to determine if it has been granted authority to reserve keys in the specified name space, and if so, to determine if it has enough available keys remaining to fulfill the specified range.

If the key manager does not have authority to fulfill the request, the key manager sends a reservation request to the next higher level key manager (block 206). This reservation request may specify a larger range of keys than the key request received at block 202, for the reasons discussed above. The key manager then waits to receive authority to reserve the requested key range (block 208).

Once the key manager determines that it has authority to reserve the requested keys (or receives authority to reserve the requested keys from the next higher level key manager), the key manager reserves the lookup key or range of keys by associating it with the requesting entity, the specified name space and the specified application type (block 210). The key manager updates its local Delegated Table 53 and/or Reserved Table 55 (block 212), and sends a response to the initial reservation request indicating that the requested lookup key or key range has been reserved (block 214). In some embodiments, the key manager may also send an update message (block 216) to a supervisor 300 (shown in FIG. 9) that informs the supervisor 300 of the reservation and allocation of the key or key range by the key manager, as discussed in more detail below.

If a key range that has been delegated to a key manager becomes exhausted, the key manager may request another range from the next higher key manager. If the initial delegation scheme is made with gaps in the delegated ranges, it may be possible to delegate a new range adjacent to the one(s) already delegated, so that an update only amounts to expanding an existing range. This way, the size of the Delegated Table 53 and the Reserved Table 55 can be kept as small as possible.

If a key manager or application process crashes, it will lose its delegated ranges. Therefore, some embodiments provide systems/methods that make upper level key managers aware when they have to delegate the lost ranges again. This can be done by having a hierarchical supervision mechanism between the key managers, so that they can discover when one of their children die and come back again. Some embodiments may employ a reservation expiration mechanism, similar to the one used in dynamic host configuration protocol (DHCP), in which any application or key manager that reserves a key range must send regular renewal requests to its upper level key manager in order to maintain its reservations.

Figure 9:
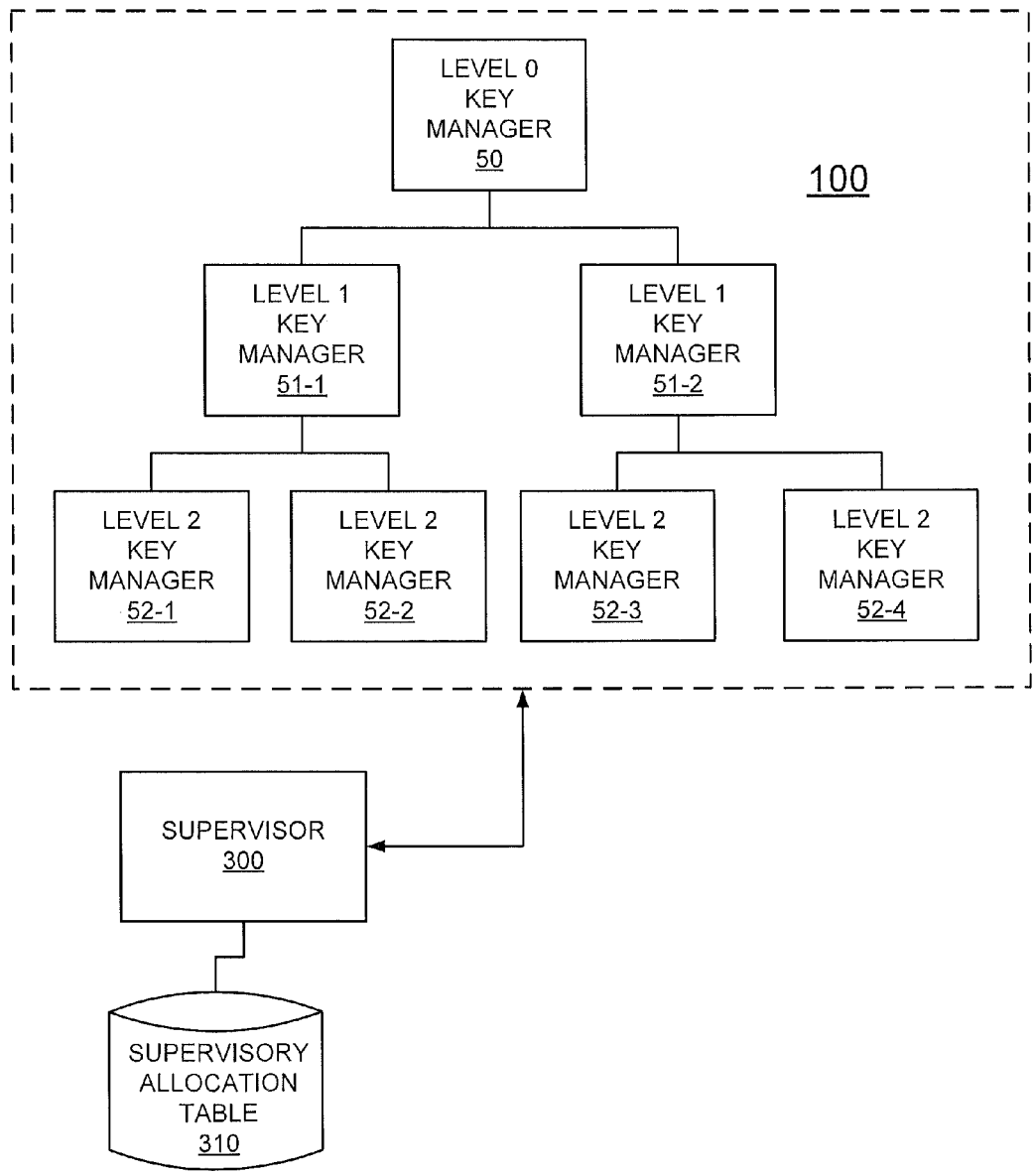
FIG. 9 illustrates a hierarchical key management system in accordance with further embodiments.

Other embodiments are illustrated in FIG. 9. As shown therein, a supervisor node 300 may communicate with the key management system 100. In particular, the individual key managers 50, 51, 52 may report delegations of authority to reserve lookup keys and reservations of lookup keys to the supervisor 300, which may store information about the key delegations and reservations in a supervisory allocation table 310. When a key manager crashes, it can recover its key delegations and reservations by sending a query to the supervisor 300.

At any given time, the delegation tree may become unbalanced for a certain key type. For example, one branch of the tree (or sub-tree) may reserve a particularly high number of ranges, while another branch of the tree or sub-tree one has reserved much fewer. In order to preserve service continuity, it may be desirable for the key manager of the two branches to rebalance the tree. This can be done by providing a command or other mechanism for a key manager to reclaim ranges from the lower layers, provided that those ranges have not been reserved by an application. For example, a key manager can issue a "report" command to one or more key managers in the next lower level asking them to report the lookup keys they have allocated within a particular name space. Alternatively, the key manager can query the supervisory allocation table 310 to determine which lookup keys have been reserved. Based on this information, the key manager can determine which key ranges can be reclaimed and re-assigned among the lower level key managers.

In other embodiments, the supervisor node 300 can analyze delegation and allocation information provided by the key managers and stored in the supervisory allocation table 310 to determine when rebalancing is needed. The supervisor node 300 can also instruct one or more of the key managers regarding how to rebalance the key delegations to improve a system parameter, such as speed, efficiency, etc.

As will be appreciated by one of skill in the art, the present invention may be embodied as a method, a system, and/or computer program product. Furthermore, the present invention may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments of the present invention are described herein with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the present invention may be written in an object oriented programming language such as Java or C++. However, the computer program code for carrying out operations of the present invention may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of reserving lookup keys in a computer communication system including a hierarchy of key manager nodes, the method comprising:
   receiving a first reservation request at a first key manager node at a first level of the hierarchy of key manager nodes, the first reservation request requesting reservation of a lookup key;
   determining whether or lot the first key manager node has authority to grant the reservation request;
   in response to determining that the first key manager node does not have authority to grant the reservation request, sending a second reservation request requesting reservation of the lookup key to a second key manager node that is at a second level of the hierarchy of key manager nodes;
   receiving a delegation of authority to grant the reservation request from the second key manager node; and
   in response to receiving the delegation of authority, granting the reservation request.

2. The method of claim 1, further comprising:
   in response to determining that the first key manager node has authority to grant the reservation request, granting the reservation request and sending a response to the reservation request confirming reservation of the lookup key.

3. The method of claim 1, wherein the first reservation request specifies a first range of lookup keys, and wherein the second reservation request specifies a second range of lookup keys that is greater than the first range of lookup keys.

4. The method of claim 3, further comprising:
   receiving a delegation of authority from the second key manager node to reserve the second range of lookup keys; and
   in response to receiving the delegation or authority, reserving the first range of lookup keys and sending a response to the reservation request confirming reservation of the first range of lookup keys.

5. The method of claim 4, wherein the delegation of authority includes authority to reserve a third range of lookup keys that includes the second range of lookup keys.

6. The method of claim 1, further comprising:
   reporting reservation of the lookup key to a reservation supervisor node.

7. The method of claim 3, wherein the second range of lookup keys is at least twice as large as the first range of lookup keys.

8. The method of claim 6, wherein the second range of lookup keys is at least ten times as large as the first range of lookup keys.

9. The method of claim 1, wherein the second key manager node comprises a root key manager node, the method further comprising creating the lookup key at the root manager key node.

10. A key manager node, comprising:
a processor configured to receive a first reservation request from an application, the first reservation request requesting reservation of a lookup key, configured to determine whether or not the key manager node has authority to grant the reservation request, and in response to determining that the key manager node does not have authority to grant the reservation request, configured to send a second reservation request requesting reservation of the lookup key to a second key manager node that is at a. higher level of a hierarchy of key manager nodes than the key manager node;
wherein the processor is further configured to receive a delegation of authority to grant the reservation request from the second key manager node and in response to receiving the delegation of authority. to grant the reservation request.

11. The key manager node of claim 10, wherein the processor is further configured to grant the reservation request and send a response to the reservation request confirming reservation of the lookup key in response to determining that the key manager node has authority to grant the reservation request.

12. The key manager node of claim 10, wherein the first reservation request specifies a first range of lookup keys, and wherein the second reservation request specifies a second range of lookup keys that is greater than the first range of lookup keys.

13. The key manager node of claim 12, wherein the processor is further configured to receive a delegation of authority from the second key manager node to reserve the second range of lookup keys, and in response to receiving the delegation of authority, to reserve the first range of lookup keys and send a response to the reservation request confirming reservation of the first range of lookup keys.

14. The key manager node of claim 13, wherein the delegation of authority includes authority to reserve a third range of lookup keys that includes the second range of lookup keys.

15. The key manager node of claim 10, wherein the processor is further configured to report reservation of the lookup key to a reservation supervisor node.

16. The key manager node of claim 12, wherein the second range of lookup keys is at least twice as large as the first range of lookup keys.

17. The key manager node of claim 15, wherein the second range of lookup keys is at least ten times as large as the first range of lookup keys.

18. A hierarchical key management system, comprising:
a plurality of key manager nodes arranged in a hierarchy including a root key manager node and a plurality of intermediate key manager nodes;
wherein each of the intermediate nodes is configured to receive a first reservation request from an application or a lower level key manager node, the first reservation request requesting reservation of a lookup key, configured to determine whether or not the intermediate key manager node has authority to grant the reservation request, and in response to determining that the intermediate key manager node does not have authority to grant the reservation request, configured to send a second reservation request requesting reservation of the lookup key to a second key manager node that is at a higher level of the hierarchy than the intermediate key manager node;
wherein the each of the intermediate nodes is further configured to receive a delegation of authority to grant the reservation request from the second key manager node, and in response to receiving the delegation of authority, to grant the reservation request.

* * * * *